(12) United States Patent
Wang et al.

(10) Patent No.: US 12,523,660 B2
(45) Date of Patent: Jan. 13, 2026

(54) NANO FLUORESCENT LATEX PIGMENT WITH HIGH FLUORESCENCE INTENSITY AND HIGH STABILITY AND PREPARATION METHOD THEREFOR

(71) Applicant: Huangshan Jiajia Fluorescent Materials Co., Ltd, Anhui (CN)

(72) Inventors: Jimin Wang, Anhui (CN); Liping Zhang, Anhui (CN); Chongjian Wang, Anhui (CN); Jianming Pan, Anhui (CN); Yan Zhou, Anhui (CN); Shibin Yu, Anhui (CN)

(73) Assignee: Huangshan Jiajia Fluorescent Materials Co., Ltd, Huangshan (CN)

( * ) Notice: Subject to any disclaimer, the term of this patent is extended or adjusted under 35 U.S.C. 154(b) by 0 days.

(21) Appl. No.: 19/023,243

(22) Filed: Jan. 15, 2025

(65) Prior Publication Data
US 2025/0180568 A1    Jun. 5, 2025

Related U.S. Application Data

(63) Continuation of application No. PCT/CN2023/136980, filed on Dec. 7, 2023.

(51) Int. Cl.
*G01N 33/58* (2006.01)
*G01N 33/52* (2006.01)

(52) U.S. Cl.
CPC ......... *G01N 33/582* (2013.01); *G01N 33/528* (2013.01)

(58) Field of Classification Search
CPC .................. G01N 33/582; G01N 33/528
See application file for complete search history.

(56) References Cited

U.S. PATENT DOCUMENTS 4,698,262 A * 10/1987 Schwartz .................. C08F 8/00
526/201

FOREIGN PATENT DOCUMENTS

| CN | 103588925 | A |   | 2/2014  |           |
|----|-----------|---|---|---------|-----------|
| CN | 104262522 | A |   | 1/2015  |           |
| CN | 105017462 | A |   | 11/2015 |           |
| CN | 105646789 |   | * | 6/2016  | G01N 33/582 |
| CN | 107880877 | A |   | 4/2018  |           |
| CN | 109535861 | A |   | 3/2019  |           |
| EP | 0344379   | A2|   | 12/1989 |           |
| JP | 2008037976| A |   | 2/2008  |           |

* cited by examiner

*Primary Examiner* — Gailene Gabel

(57) ABSTRACT

Disclosed are a nano fluorescent latex pigment with high fluorescent intensity and high stability and a preparation method therefor in the technical field of fluorescent pigments. An oil phase and an aqueous phase are included. The oil phase includes 0.8 to 0.9 wt % of fluorescent dye, 40 to 45 wt % of polymer monomer, 0.2 to 0.22 wt % of co-emulsifier, and 0.2 to 0.22 wt % of initiator. The aqueous phase includes 5 to 7 wt % of mixed emulsifier, and 0 to 0.3 wt % of sodium bicarbonate, with the balance being water. The preparation method for the nano fluorescent latex pigment includes four steps, namely, oil phase preparation, aqueous phase preparation, mini-emulsion preparation, and mini-emulsion polymerization. In the present disclosure, a nano fluorescent latex pigment with high fluorescence intensity, small particle size, uniform distribution, and good dispersion stability is successfully prepared, thereby expanding the application range of nano fluorescent latex pigments.

5 Claims, 2 Drawing Sheets

NANO FLUORESCENT LATEX PIGMENT WITH HIGH FLUORESCENCE INTENSITY AND HIGH STABILITY AND PREPARATION METHOD THEREFOR

CROSS-REFERENCE TO RELATED APPLICATIONS

This application is a continuation of PCT/CN2023/136980, filed on Dec. 7, 2023 and claims priority of Chinese Patent Application No. 202311632998.2, filed on Dec. 1, 2023, the entire contents of which are incorporated herein by reference.

TECHNICAL FIELD

The present disclosure relates to the technical field of fluorescent pigments, and in particular to a nano fluorescent latex pigment with high fluorescent intensity and high stability and a preparation method therefor.

BACKGROUND

The fluorescent dye is a functional dye that absorbs short-wavelength electromagnetic waves in the ultraviolet or visible light wave band and converts them into long-wavelength electromagnetic waves. The resulting long-wavelength waves typically fall within the visible light range and, when combined with reflected light, can produce a brilliant fluorescent effect. Therefore, the application scope of fluorescent dyes covers various fields, including display, identification, detection, probes, and many others. However, fluorescent dyes are prone to fluorescence quenching, where the irreversible degradation of fluorescent molecules due to internal and external factors results in issues such as inactivation or deterioration of fluorescence properties, shortened fluorescence lifetime, and poor controllability of fluorescence. These issues bring challenges to the convenience and repeatability of fluorescent dye applications.

Fluorescent latex pigment is a monodisperse spherical fluorescent material with high fluorescence intensity, excellent fluorescence stability, and ease of use. Fluorescent latex pigments are primarily composed of fluorescent dyes and polymer organic compounds, which address the issue of poor fluorescence stability during the application of fluorescent dyes and reduce the technical barriers to the use of fluorescent materials. Currently, there are various preparation methods for fluorescent latex pigments, which can be classified into adsorption, entrapment, grafting, copolymerization, and others, depending on the method of combining fluorescent dyes with latex microspheres. Entrapment is a preparation method in which fluorescent dye is added before or during the polymerization process, resulting in fluorescent dye molecules being wrapped by polymer chains and encapsulated within the microspheres to form fluorescent microspheres. This method offers advantages such as uniform fluorescence distribution and high fluorescence intensity.

Currently, the preparation technology for fluorescent latex pigments with high fluorescence intensity and high stability is still restricted by the United States, Japan, South Korea, and other countries. There is a gap in the application performance of domestic fluorescent latex pigments, mainly due to their low fluorescence intensity. Additionally, the dispersion stability is poor during storage, transportation, and application, and the fluorescence intensity further decreases as the latex pigments agglomerate, which prevents them from meeting the requirements of high-fluorescence-intensity applications.

SUMMARY

An object of the present disclosure is to provide a nano fluorescent latex pigment with high fluorescence intensity and high stability and a preparation method therefor, to solve the technical problems of low fluorescence intensity and poor dispersion stability in existing fluorescent latex pigments.

The object of the present disclosure may be achieved by the following technical solutions.

A nano fluorescent latex pigment with high fluorescence intensity and high stability includes an oil phase and an aqueous phase, where, in weight percent, the oil phase includes 0.8 to 0.9 wt % of fluorescent dye, 40 to 45 wt % of polymer monomer, 0.2 to 0.22 wt % of co-emulsifier, and 0.2 to 0.22 wt % of initiator; and the aqueous phase includes 5 to 7 wt % of mixed emulsifier, and 0 to 0.3 wt % of sodium bicarbonate, with the balance being water (that is, making up the weight percent to 100 wt % with water).

Further, the fluorescent dye includes, but is not limited to, any one of Rhodamine, fluorescein, fluorescent magenta, fluorescent orange, fluorescent green, and fluorescent violet.

Further, a particle size of dispersion in the nano fluorescent latex pigment is 80 to 105 nm.

Further, the polymer monomer is a mixed composition of styrene, methacrylic acid, and acrylonitrile in a mass ratio of 48 to 48.5:1:17 to 17.2.

The polymer monomer composed of the above components has good compatibility with fluorescent dyes, ensuring the color performance and fluorescence intensity of the nano fluorescent latex pigment. Additionally, with an appropriate glass transition temperature, it can regulate the steric hindrance and electrostatic repulsion between particles, promoting the uniform dispersion of nanoparticles in the nano fluorescent pigment and preventing the aggregation of fluorescent dyes.

Further, the co-emulsifier includes any one of hexadecane, hexadecanol, and glycerol.

Further, the initiator is an oil-soluble initiator including one of 2,2'-Azobis(2-methylpropionitrile) (AIBN) and 2,2'-Azobis(2-methylpropionamidine) dihydrochloride (AIBA).

Further, the mixed emulsifier is a polymerizable anionic emulsifier mixed with a non-ionic emulsifier in a mass ratio of 5:1; the polymerizable anionic emulsifier includes, but is not limited to, one or more of SR-10 (an anionic emulsifier REASOAP SR-10 manufactured by ADEKA Corporation), R-4001 (an anionic emulsifier manufactured by MERYER Corporation, Shanghai, China), and R-4006 (an anionic emulsifier manufactured by HANERCHEM Corporation, China) mixed in arbitrary proportions; and the non-ionic emulsifier includes, but is not limited to, one or more of Y-8093 (a nonionic surfactant manufactured by Dow Chemical Company Y-8094 (a nonionic surfactant manufactured by Dow Chemical Company), PVA1788 (a nonionic surfactant manufactured by Sinopharm Chemical Reagent Co., Ltd.), and OP-10 (a nonionic surfactant manufactured by MERYER Corporation, Shanghai, China) mixed in arbitrary proportions. By compounding the polymerizable anionic emulsifier with the non-ionic emulsifier and controlling the total amount of the mixed emulsifier, the particle size of the dispersion in the nano fluorescent latex pigment may be made small and uniform, thereby improving the dispersion uniformity and dispersion stability of the nano fluorescent latex pigment.

A preparation method for the nano fluorescent latex pigment with high fluorescent intensity and high stability includes the following steps:
(1) oil phase preparation: dissolving the fluorescent dye into the polymer monomer before adding the co-emulsifier and the initiator to mix, to prepare a clear and transparent oil phase;
(2) aqueous phase preparation: adding the mixed emulsifier into water before stirring and dissolving, and then adding sodium bicarbonate before stirring and dissolving, to prepare the aqueous phase;
(3) mini-emulsion preparation: adding the oil phase prepared in step (1) dropwise to the aqueous phase prepared in step (2), and performing emulsification and dispersion using a homogenizer, to prepare an oil-in-water mini-emulsion; and
(4) mini-emulsion polymerization: transferring the mini-emulsion prepared in step (3) into a three-necked flask equipped with a stirrer, a thermometer, and a feeding port, followed by heating up and performing polymerization reaction for 7 h at a rotational speed of 400 to 600 rpm; and after cooling and discharging, filtering and centrifugally washing to remove impurities, to obtain the nano fluorescent latex pigment.

Further, in step (3), a rotational speed for performing emulsification using the homogenizer is 7 to 9 krpm; and emulsification time is 35 to 45 min.

Further, in step (4), the polymerization reaction is performed at 55 to 65° C. By precisely controlling the temperature during the mini-emulsion polymerization reaction, the chromogenic properties, fluorescence properties, and fluorescence lifetime of the nano fluorescent latex pigment are ensured.

The beneficial effects of the present disclosure are as follows:

In the present disclosure, first, the composition and dosage range of the polymer monomer are set to enhance compatibility with the fluorescent dye, ensuring the fluorescent dye achieves optimal chromogenic performance. The glass transition temperature of the polymer monomer is also optimized, and the steric hindrance and electrostatic repulsion between particles are regulated. This promotes the dispersion of the dispersion in the nano fluorescent latex pigment, thereby preventing the decrease in fluorescence performance caused by the excessive aggregation of the fluorescent dye. Secondly, by compounding the polymerizable anionic emulsifier with the non-ionic emulsifier and controlling the total amount of the mixed emulsifier, the particle size of the dispersion in the nano fluorescent latex pigment may be made small and uniform, further improving the dispersion uniformity and dispersion stability of the nano fluorescent latex pigment. Finally, the temperature, emulsification speed, and emulsification time during the preparation of the nano fluorescent latex pigment have a significant impact on the photophysical properties of the fluorescent dye, such as chromogenic properties, fluorescence properties, and fluorescence lifetime. Therefore, the preparation process parameters are precisely controlled to minimize their effect on the fluorescent dye and further enhance the fluorescence properties.

In the present disclosure, a nano fluorescent latex pigment with high fluorescent intensity, small particle size, uniform distribution, and good stability is successfully prepared by first emulsifying and dispersing an oil phase and an aqueous phase to form a mini-emulsion, and then polymerizing the mini-emulsion. This method resolves the issue of fluorescence performance degradation or even disappearance caused by the quenching and deactivation of fluorescent dyes, and overcomes challenges such as poor stability, uneven polymer dispersity index (PDI), and difficulties in long-term storage and transportation of existing nano fluorescent latex pigments. Without affecting the solid content and fluorescence properties, the fluorescence performance becomes more stable and controllable, the stability is significantly improved, and the application range of nano fluorescent latex pigments is further expanded.

BRIEF DESCRIPTION OF THE DRAWINGS

The present disclosure will now be further described with reference to the drawings.

DETAILED DESCRIPTION

The technical solutions in the examples of the present disclosure will be described clearly and completely below in combination with the examples of the present disclosure. Clearly, the described examples are only some, rather than all examples of the present disclosure. All other examples obtained by those ordinarily skilled in the art based on the examples in the present disclosure without creative work shall fall within the scope of protection of the present disclosure.

Example 1

This example provides a nano fluorescent latex pigment with high fluorescent intensity and high stability, prepared by the following steps:
(1) Oil phase preparation: 0.95 g of Rhodamine was dissolved into a polymer monomer composed of 34.55 g of styrene, 0.75 g of methacrylic acid, and 12.5 g of acrylonitrile before adding 0.24 g of hexadecanol and 0.24 g of AIBN to mix to prepare a clear and transparent oil phase.
(2) Aqueous phase preparation: a mixed emulsifier composed of 4.1248 g of SR-10, 0.8752 g of R-4001, 0.6798 g of Y-8093, and 0.3202 g of PVA1788 was added into 60 g of water before stirring and dissolving, to prepare an aqueous phase.
(3) Mini-emulsion preparation: the oil phase was added dropwise to the aqueous phase within 30 min, followed by performing emulsification and dispersion for 45 min using a homogenizer at 7 krpm, to prepare an oil-in-water mini-emulsion.
(4) Mini-emulsion polymerization: the mini-emulsion was transferred into a three-necked flask equipped with a stirrer, a thermometer, and a feeding port, followed by heating up to 55° C. and performing reaction for 7 h at a rotational speed of 400 rpm; and after cooling and discharging, impurities were removed through filtering and centrifugally washing, to obtain a nano fluorescent latex pigment with high fluorescence intensity and high dispersion stability.

Example 2

Figure 1:
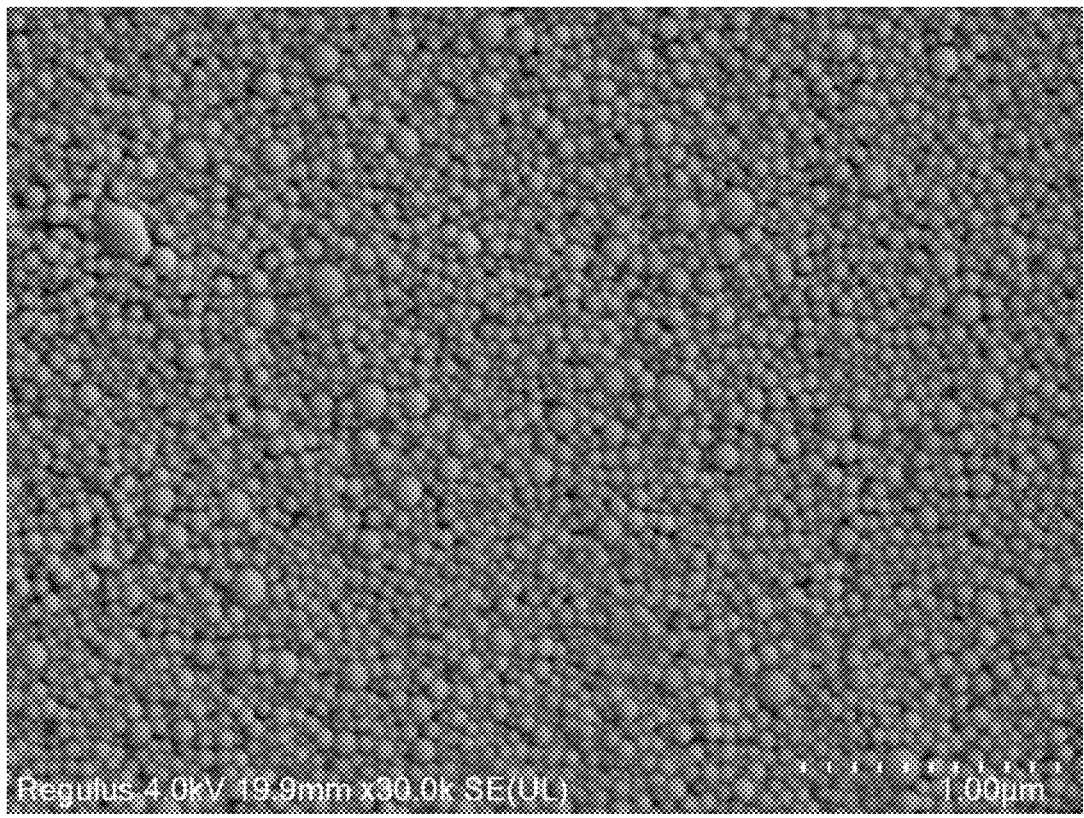
FIG. 1 is a scanning electron microscope (SEM) image of a nano fluorescent latex pigment prepared in Example 2 of the present disclosure.
Figure 2:
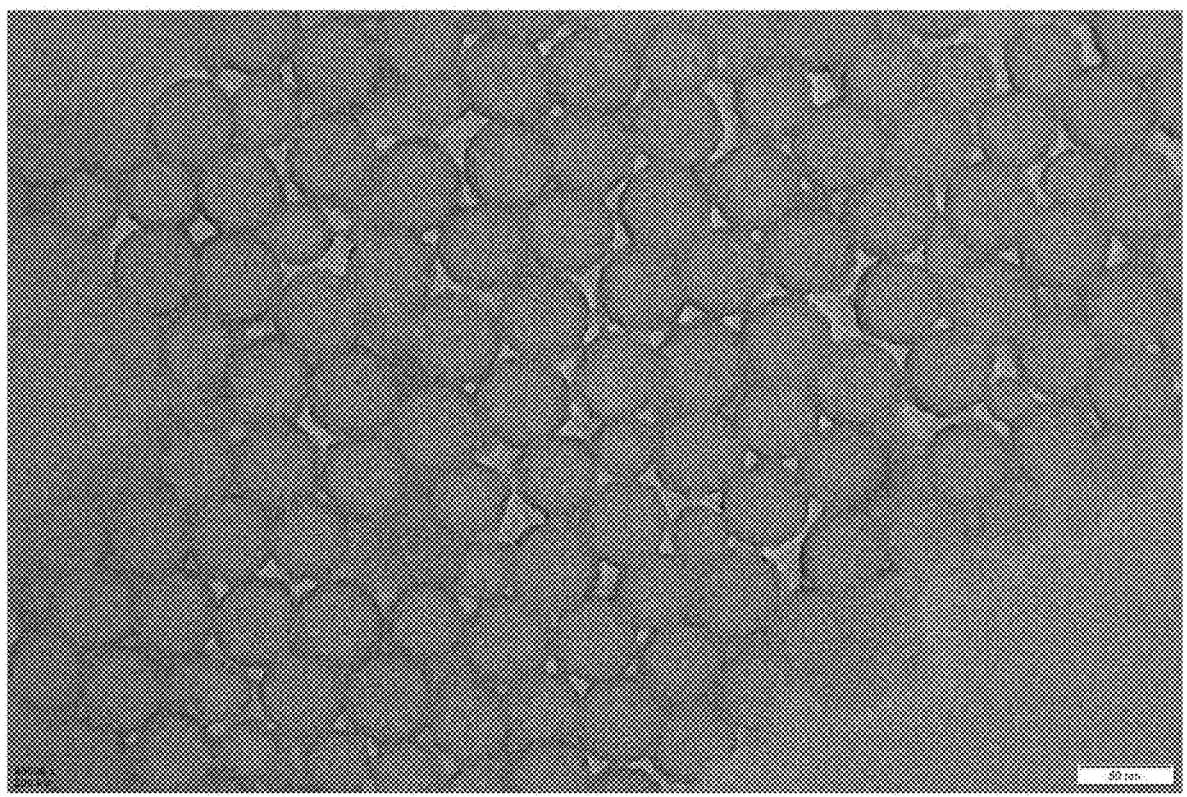
FIG. 2 is a transmission electron microscope (TEM) image of a nano fluorescent latex pigment prepared in Example 2 of the present disclosure.

This example provides a nano fluorescent latex pigment with high fluorescent intensity and high stability, prepared by the following steps:
(1) Oil phase preparation: 1.05 g of fluorescein was dissolved into a polymer monomer composed of 36.35 g of styrene, 0.75 g of methacrylic acid, and 12.9 g of acrylonitrile before adding 0.25 g of hexadecane and 0.25 g of AIBN to mix to prepare a clear and transparent oil phase.
(2) Aqueous phase preparation: a mixed emulsifier composed of 5.3995 g of SR-10, 0.9817 g of R-4001, 0.8508 g of Y-8093, and 0.4254 g of Y-8094 was added into 60 g of water before stirring and dissolving and adding 0.36 g of sodium bicarbonate, to prepare an aqueous phase.
(3) Mini-emulsion preparation: the oil phase was added dropwise to the aqueous phase within 30 min, followed by performing emulsification and dispersion for 40 min using a homogenizer at 8 krpm, to prepare an oil-in-water mini-emulsion.
(4) Mini-emulsion polymerization: the mini-emulsion was transferred into a three-necked flask equipped with a stirrer, a thermometer, and a feeding port, followed by heating up to 60° C. and performing reaction for 7 h at a rotational speed of 500 rpm; and after cooling and discharging, impurities were removed through filtering and centrifugally washing, to obtain a nano fluorescent latex pigment with high fluorescence intensity and high dispersion stability. The dispersion in the nano fluorescent latex pigment is shown in more detail in FIGS. 1 and 2.

Example 3

This example provides a nano fluorescent latex pigment with high fluorescent intensity and high stability, prepared by the following steps:
(1) Oil phase preparation: 1.07 g of fluorescent green was dissolved into a polymer monomer composed of 39.12 g of styrene, 0.81 g of methacrylic acid, and 13.87 g of acrylonitrile before adding 0.26 g of glycerol and 0.26 g of AIBA to mix to prepare a clear and transparent oil phase.
(2) Aqueous phase preparation: a mixed emulsifier composed of 3.6548 g of R-4006, 3.3452 g of R-4001, 0.6847 g of Y-8093, and 0.7153 g of OP-10 was added into 65 g of water before stirring and dissolving and adding 0.2 g of sodium bicarbonate, to prepare an aqueous phase.
(3) Mini-emulsion preparation: the oil phase was added dropwise to the aqueous phase within 30 min, followed by performing emulsification and dispersion for 35 min using a homogenizer at 9 krpm, to prepare an oil-in-water mini-emulsion.
(4) Mini-emulsion polymerization: the mini-emulsion was transferred into a three-necked flask equipped with a stirrer, a thermometer, and a feeding port, followed by heating up to 65° C. and performing reaction for 7 h at a rotational speed of 600 rpm; and after cooling and discharging, impurities were removed through filtering and centrifugally washing, to obtain a nano fluorescent latex pigment with high fluorescence intensity and high dispersion stability.

Comparative Example 1

In this example, compared with Example 2, "a polymer monomer composed of 36.35 g of styrene, 0.75 g of methacrylic acid, and 12.9 g of acrylonitrile" was replaced with "a polymer monomer composed of 49.25 g of styrene and 0.75 g of methacrylic acid", and the remaining raw materials and preparation methods were the same.

Comparative Example 2

In this example, compared with Example 2, "a polymer monomer composed of 36.35 g of styrene, 0.75 g of methacrylic acid, and 12.9 g of acrylonitrile" was replaced with "a polymer monomer composed of 35.79 g of styrene, 1.5 g of methacrylic acid, and 12.71 g of acrylonitrile", and the remaining raw materials and preparation methods were the same.

Comparative Example 3

In this example, compared with Example 2, "a polymer monomer composed of 36.35 g of styrene, 0.75 g of methacrylic acid, and 12.9 g of acrylonitrile" was replaced with "a polymer monomer composed of 36.87 g of styrene and 13.13 g of acrylonitrile", and the remaining raw materials and preparation methods were the same.

Comparative Example 4

In this example, compared with Example 2, "a polymer monomer composed of 36.35 g of styrene, 0.75 g of methacrylic acid, and 12.9 g of acrylonitrile" was replaced with "a polymer monomer composed of 36.35 g of styrene, 0.75 g of methacrylic acid, and 12.9 g of isooctyl acrylate", and the remaining raw materials and preparation methods were the same.

Comparative Example 5

In this example, compared with Example 2, "a polymer monomer composed of 36.35 g of styrene, 0.75 g of methacrylic acid, and 12.9 g of acrylonitrile" was replaced with "a polymer monomer composed of 36.35 g of methyl methacrylate, 0.75 g of methacrylic acid, and 12.9 g of isooctyl acrylate", and the remaining raw materials and preparation methods were the same.

Comparative Example 6

In this example, compared with Example 2, the "mixed emulsifier composed of 5.3995 g of SR-10, 0.9817 g of R-4001, 0.8508 g of Y-8093, and 0.4254 g of Y-8094" was replaced with the "mixed emulsifier composed of 6.4794 g of SR-10 and 1.1780 g of R-4001", and the remaining raw materials and preparation methods were the same.

Comparative Example 7

In this example, compared with Example 2, the "mixed emulsifier composed of 5.3995 g of SR-10, 0.9817 g of R-4001, 0.8508 g of Y-8093, and 0.4254 g of Y-8094" was replaced with the "mixed emulsifier composed of 5.1049 g of Y-8093 and 2.5525 g of Y-8094", and the remaining raw materials and preparation methods were the same.

Comparative Example 8

In this example, compared with Example 2, the "mixed emulsifier composed of 5.3995 g of SR-10, 0.9817 g of R-4001, 0.8508 g of Y-8093, and 0.4254 g of Y-8094" was replaced with the "mixed emulsifier composed of 6.3812 g of DM-1501, 0.8508 g of Y-8093, and 0.4254 g of Y-8094", and the remaining raw materials and preparation methods are the same.

Comparative Example 9

In this example, compared with Example 2, the "mixed emulsifier composed of 5.3995 g of SR-10, 0.9817 g of R-4001, 0.8508 g of Y-8093, 0.4254 g of Y-8094" was replaced with the "mixed emulsifier composed of 6.4793 g of SR-10, 1.1781 g of R-4001, 1.0210 g of Y-8093, and 0.5105 g of Y-8094", and the remaining raw materials and preparation method were the same.

Comparative Example 10

In this example, compared with Example 2, the "mixed emulsifier composed of 5.3995 g of SR-10, 0.9817 g of R-4001, 0.8508 g of Y-8093, 0.4254 g of Y-8094" was replaced with the "mixed emulsifier composed of 4.3190 g of SR-10, 0.7853 g of R-4001, 0.6800 g of Y-8093, and 0.3400 g of Y-8094", and the remaining raw materials and preparation method were the same.

Comparative Example 11

In this example, compared with Example 2, "heating up to 60° C. and performing reaction for 7 h" in step (4) was replaced with "heating up to 80° C. and performing reaction for 7 h", and the remaining preparation methods were the same.

Comparative Example 12

In this example, compared with Example 2, "heating up to 60° C. and performing reaction for 7 h" in step (4) was replaced with "heating up to 50° C. and performing reaction for 7 h", and the remaining preparation methods were the same.

Comparative Example 13

In this example, compared with Example 2, "performing emulsification and dispersion for 40 min using a homogenizer at 8 krpm" in step (3) was replaced with "performing emulsification and dispersion for 40 min using a homogenizer at 10 krpm", and the remaining preparation methods were the same.

Comparative Example 14

In this example, compared with Example 2, "performing emulsification and dispersion for 40 min using a homogenizer at 8 krpm" in step (3) was replaced with "performing emulsification and dispersion for 40 min using a homogenizer at 3 krpm", and the remaining preparation methods were the same.

Comparative Example 15

In this example, compared with Example 2, "performing emulsification and dispersion for 40 min using a homogenizer at 8 krpm" in step (3) was replaced with "performing emulsification and dispersion for 60 min using a homogenizer at 10 krpm", and the remaining preparation methods were the same.

Comparative Example 16

In this example, compared with Example 2, "performing emulsification and dispersion for 40 min using a homogenizer at 8 krpm" in step (3) was replaced with "performing emulsification and dispersion for 20 min using a homogenizer at 10 krpm", and the remaining preparation methods were the same.

Comparative Example 17

This comparative example is a nano fluorescent latex pigment (LWF series water-based emulsion nano fluorescent latex pigment manufactured by Huangshan Jiajia Fluorescent Materials Co., Ltd.), which is currently commercially available.

Comparative Example 18

This comparative example is a commercially available nano fluorescent latex pigment (manufactured by SINLOIHI CO., LTD).

Comparative Example 19

In this comparative example, a conventional emulsion polymerization method is used to prepare a nano fluorescent latex pigment, including the following steps:
(1) Oil phase preparation: 0.94 g of fluorescein was weighed and dissolved into a polymer monomer composed of 32.94 g of styrene, 0.67 g of methacrylic acid, and 11.09 g of acrylonitrile before mixing well to obtain an oil phase.
(2) Aqueous phase preparation: a mixed emulsifier composed of 5.3995 g of SR-10, 0.9817 g of R-4001, 0.8508 g of Y-8093, and 0.4254 g of Y-8094 was added into 60 g of water before stirring and dissolving and adding 0.36 g of sodium bicarbonate, to prepare an aqueous phase.
(3) Emulsion polymerization: under a stirring condition of 2 krpm, half of the aqueous phase was slowly dropped into the oil phase within 30 min before mixing well, to obtain a pre-emulsion; and 0.18 g of ammonium persulphate (APS) was weighed and dissolved into 10 mL of water to obtain an initiator solution. Firstly, ⅓ of the initiator solution was added dropwise into the other half of the aqueous phase, then the pre-emulsion was slowly added dropwise under stirring at 400 rpm before heating up to 75° C. and adding dropwise ⅓ of the initiator solution into the reaction system during the reaction for 1 h and 2 h, respectively, and then reacting for 3 h. After cooling and discharging, impurities were removed through filtering and centrifugally washing, to obtain a nano fluorescent latex pigment.

Performance tests were performed on the nano fluorescent latex pigments of Example 1 to Example 3 and Comparative example 1 to Comparative example 19.
(1) Solid Content The solid content of the sample was determined by weighing: a small amount of pigment sample was taken before drying in an oven to constant weight and calculating the solid content of the sample according to the following formula:

$$\text{Solid content} = M_1/M_0 \times 100\%,$$

where $M_0$ is the mass of the sample taken, and $M_1$ is the mass of the dried sample.

(2) Particle Size and PDI

A small amount of sample was diluted with deionized water by a factor of 1000; an appropriate amount of the diluted sample was taken to a particle size dish and then placed into a Nano-Zs90 Zeta potential and particle size analyzer; and the particle size and PDI of the sample was determined at 25° C., followed by making determination for 3 times and taking the average value.

(3) Stability

An appropriate amount of sample was taken, sealed, and then placed in an oven at 60° C. for standing and storage. The state of the sample was regularly observed, and the time when precipitation appears at the bottom of the sample was recorded, to indicate the thermal stability of the sample.

An appropriate amount of sample was taken, sealed, and then placed at room temperature for standing and storage. The state of the sample was regularly observed, and the time when precipitation appears at the bottom of the sample was recorded, to indicate the storage stability at room temperature of sample.

The results of the testing are shown in Table 1:

TABLE 1

| Grouping | Solid content/% | Average particle size/nm | PDI | Time to start settling/h Room temperature | 60° C. |
|---|---|---|---|---|---|
| Example 1 | 49.8 | 80.6 | 0.203 | 714 | 94 |
| Example 2 | 50.3 | 84.2 | 0.184 | 720 | 96 |
| Example 3 | 50.6 | 105.4 | 0.181 | 718 | 95 |
| Comparative example 1 | 41.5 | 240.8 | 0.334 | 120 | 12 |
| Comparative example 2 | 43.3 | 72.8 | 0.153 | 360 | 60 |
| Comparative example 3 | 50.8 | 223.5 | 0.228 | 96 | 24 |
| Comparative example 4 | Fluorescent dye is not over-molded successfully | | | | |
| Comparative example 5 | Fluorescent dye is not over-molded successfully | | | | |
| Comparative example 6 | 40.7 | 128.1 | 0.263 | 48 | 24 |
| Comparative example 7 | 36.6 | 328.3 | 0.428 | 12 | 6 |
| Comparative example 8 | 42.4 | 150.7 | 0.213 | 36 | 20 |
| Comparative example 9 | 40.7 | 74.0 | 0.067 | 48 | 24 |
| Comparative example 10 | 40.2 | 91.5 | 0.233 | 48 | 48 |
| Comparative example 11 | 41.8 | 80.6 | 0.147 | 200 | 24 |
| Comparative example 12 | 30.8 | 160.5 | 0.358 | 72 | 12 |
| Comparative example 13 | 44.0 | 84.9 | 0.139 | 216 | 48 |
| Comparative example 14 | 32.8 | 82.2 | 0.236 | 192 | 40 |
| Comparative example 15 | 41.2 | 82.1 | 0.195 | 480 | 46 |
| Comparative example 16 | 42.1 | 79.3 | 0.202 | 312 | 72 |
| Comparative example 17 | 51.3 | 230.5 | 0.262 | 96 | 24 |
| Comparative example 18 | 45.8 | 170.8 | 0.112 | 840 | 144 |
| Comparative example 19 | 49.6 | 110.5 | 0.243 | 340 | 80 |

By weight percent, 10 wt % of the nano fluorescent latex pigment prepared in Example 1 to Example 3 and Comparative example 1 to Comparative example 19, 5 wt % of the thickener DM5128, and the balance of deionized water were stirred and mixed to obtain a printed paste. The cotton fabric was printed by screen printing, pre-baked at 60° C. for 30 min, transferred to a curing machine and cured at 130° C. for 3 min to obtain a printed fluorescent fabric. The printed fluorescent fabric is tested.

(1) Fluorescence Intensity

The fluorescence intensity of the printed fluorescent fabric is expressed by the value of strength difference of the printed fluorescent fabric, and the value of strength difference is the value of fluorescence intensity. With the printed fluorescent fabric obtained in Comparative example 17 as a standard sample (with a fluorescent intensity value of 100) and the rest as comparative samples, each printed fluorescent fabric was measured at different positions for three times and the average value was taken on a Datacolor 650 bench-top spectrophotometer using a D65 light source at a viewing angle of 100.

(2) Color Fastness

The color fastness grade of the printed fluorescent fabric was tested according to GB/T 5713-2013.

The results are shown in Table 2 below.

TABLE 2

| Grouping | Fluorescence intensity | Color fastness/grade | |
|---|---|---|---|
| | | Washing fastness | Fastness to rubbing |
| Example 1 | 94.67 | 5 | 5 |
| Example 2 | 95.86 | 5 | 5 |
| Example 3 | 95.25 | 5 | 5 |
| Comparative example 1 | 76.60 | 5 | 5 |
| Comparative example 2 | 50.29 | 5 | 5 |
| Comparative example 3 | 90.80 | 5 | 5 |
| Comparative example 4 | Fluorescent dye is not over-molded successfully | | |
| Comparative example 5 | Fluorescent dye is not over-molded successfully | | |
| Comparative example 6 | 31.05 | 5 | 5 |
| Comparative example 7 | 42.19 | 5 | 5 |
| Comparative example 8 | 45.57 | 5 | 5 |
| Comparative example 9 | 53.86 | 5 | 5 |
| Comparative example 10 | 63.50 | 5 | 5 |
| Comparative example 11 | 15.82 | 5 | 5 |
| Comparative example 12 | 30.45 | 5 | 5 |
| Comparative example 13 | 62.24 | 5 | 5 |
| Comparative example 14 | 63.10 | 5 | 5 |
| Comparative example 15 | 82.53 | 5 | 5 |
| Comparative example 16 | 105.91 | 5 | 5 |
| Comparative example 17 | 100 | 5 | 5 |
| Comparative example 18 | 90.36 | 5 | 5 |
| Comparative example 19 | 86.29 | 5 | 5 |

From the test data in Table 1 and Table 2, the following conclusions may be drawn.

From the test results of Example 2 and Comparative examples 1, 4, and 5, it can be seen that the fluorescent dyes have different fluorescent properties in different dissolution systems; when the polymer monomer is not compatible with the fluorescent dye, the emulsion polymerization reaction fails, and the nano fluorescent latex pigment cannot be prepared according to Comparative example 4 and Comparative example 5; and the compatibility of the polymer monomer of Example 2 and the fluorescent dye is better, and the fluorescent latex pigment prepared therefrom has a higher fluorescent intensity and dispersion stability.

From the test results of Example 2, Comparative example 2, and Comparative example 3, it can be seen that as the amount of methacrylic acid increases, the stability of the nano fluorescent latex pigment improves. However, the fluorescence intensity decreases due to the smaller particle size and reduced solid content. When methacrylic acid is absent from the system, although the effect on fluorescence intensity is minimal, the particle size of the fluorescent latex pigment is larger, and the loss of electrostatic repulsion between particles results in poorer stability.

From the test results of Example 2 and Comparative examples 6, 7, and 8, it can be seen that a single type of emulsifier deteriorates the stability of the nano fluorescent latex pigment, resulting in low solid content and fluorescence intensity. A single type of emulsifier is insufficient to uniformly disperse the fluorescent dye. Additionally, the use of non-polymerizable anionic emulsifiers fails to meet the dispersion requirements of the fluorescent dye.

From the test results of Example 2 and Comparative examples 9 and 10, it can be seen that when the amount of the mixed emulsifier is below the range specified in the present disclosure, the content of the mixed emulsifier adsorbed on the surface of the polymerized monomer droplets is insufficient, leading to weak oil-water interface stability of the emulsion droplets. However, when the amount of the mixed emulsifier exceeds the range specified in the present disclosure, the excess emulsifier in the emulsion dissociates into micelles in the aqueous phase and forms tiny hollow-shell latex particles after polymerization. These hollow-shell latex particles are dispersed in the pigment system and their presence deteriorates the stability of the nano fluorescent latex pigment. Additionally, the fluorescence intensity decreases due to the presence of these hollow-shell latex particles.

From the test results of Example 2 and Comparative examples 11 and 12, it can be seen that when the reaction temperature is too high, the fluorescence intensity of the fluorescent latex pigment decreases sharply, which is due to fluorescence quenching and inactivation. Additionally, at higher temperatures, the mini-emulsion polymerization process becomes difficult to control and is prone to explosive polymerization. On the other hand, when the temperature is too low, both the solid content and fluorescence intensity decrease significantly, possibly because the monomer conversion rate in mini-emulsion polymerization is lower at lower temperatures, leading to an incomplete reaction.

From the test results of Example 2 and Comparative examples 13 and 14, it can be seen that with the increase in emulsification rotational speed, there is no significant change in the average particle size of the dispersion in the prepared nano fluorescent latex pigment, but the PDI shows a decreasing trend, and the particle size distribution becomes more uniform. This is because the more intense the shearing force applied by the homogenizer to the emulsion, the more uniform the size of the emulsion droplets formed. However, when the emulsification speed is too high, the strong shearing force of the homogenizer may cause the emulsifier adsorbed on the surface of the emulsion droplets to desorb and become free in the aqueous phase. In the aqueous phase, small-sized emulsion particles are formed by polymerization, which affects the stability of the dispersion system.

From the test results of Example 2 and Comparative examples 15 and 16, it can be seen that as the emulsification time increases, the particle size of the dispersion in the prepared nano fluorescent latex pigment shows little variation, and the PDI slightly decreases, indicating that the emulsification time has a minimal effect on the average particle size and PDI of the nano fluorescent latex pigment dispersion. However, the stability gradually improves because, with a shorter emulsification time, the dispersion may contain both small-sized and large-sized latex particles with a significant particle size difference. While the presence of larger latex particles can increase the fluorescence intensity, these larger particles are more prone to aggregation and precipitation, which affects the stability of the dispersion. As the emulsification time increases, the content of large-sized latex particles in the nano fluorescent latex pigment dispersion gradually decreases, improving the dispersion's stability. However, the reduction in large latex particles also leads to a relative decrease in the amount of fluorescent dye carried, resulting in a decrease in fluorescence intensity.

Finally, considering the overall performance in terms of fluorescence intensity and dispersion stability, the nano fluorescent latex pigment prepared according to the present disclosure outperforms the existing commercially available nano fluorescent latex pigments. The comprehensive performance of the nano fluorescent latex pigment is significantly improved compared to the conventional emulsion polymerization method.

It is noted that in the specification, relational terms such as first and second may be used solely to distinguish one entity or operation from another entity or operation without necessarily requiring or implying any actual relationship or order between the entities or operations. Moreover, the terms "include", "contain", or any other variation thereof, are intended to cover a non-exclusive inclusion, such that a process, method, article, or device that includes a list of elements does not include only those elements but may include other elements not expressly listed or inherent to such process, method, article, or device.

While examples of the present disclosure have been shown and described, it will be understood by those skilled in the art that various changes, modifications, substitutions, and alterations may be made to these examples without departing from the principles and spirit of the present disclosure, the scope of which is defined by the appended claims and their equivalents.

The invention claimed is:

1. A nano fluorescent latex pigment, comprising an oil phase and an aqueous phase, wherein in weight percent, the oil phase comprises 0.8 to 0.9 wt % of fluorescent dye, 40 to 45 wt % of monomer, 0.2 to 0.22 wt % of co-emulsifier, and 0.2 to 0.22 wt % of initiator; and the aqueous phase comprises 5 to 7 wt % of mixed emulsifier, and 0 to 0.3 wt % of sodium bicarbonate, with the balance being water,
the monomer being a mixed composition of styrene, methacrylic acid, and acrylonitrile in a mass ratio of 48 to 48.5:1:17 to 17.2.

2. The nano fluorescent latex pigment according to claim 1, wherein the fluorescent dye comprises any one of Rhodamine, fluorescein, fluorescent magenta, fluorescent orange, fluorescent green, and fluorescent violet.

3. The nano fluorescent latex pigment according to claim 1, wherein a particle size of dispersion in the nano fluorescent latex pigment is 80 to 105 nm.

4. The nano fluorescent latex pigment according to claim 1, wherein the co-emulsifier comprises any one of hexadecane, hexadecanol, and glycerol.

5. The nano fluorescent latex pigment according to claim 1, wherein the initiator is an oil-soluble initiator comprising any one of 2,2'-Azobis(2-methylpropionitrile) (AIBN) and 2,2'-Azobis(2-methylpropionamidine) dihydrochloride (AIBA).

* * * * *